March 11, 1941.  J. R. HEILMAN  2,234,596

COOKING APPLIANCE

Filed Nov. 30, 1938  2 Sheets-Sheet 1

INVENTOR
JOSEPH R. HEILMAN.
BY *W A Steiger*
ATTORNEY

March 11, 1941.  J. R. HEILMAN  2,234,596
COOKING APPLIANCE
Filed Nov. 30, 1938  2 Sheets-Sheet 2

WITNESSES:
R. J. Eisinger

INVENTOR
JOSEPH R. HEILMAN.
BY
ATTORNEY

Patented Mar. 11, 1941

2,234,596

UNITED STATES PATENT OFFICE 2,234,596

COOKING APPLIANCE

Joseph R. Heilman, Mansfield, Ohio, assignor to Westinghouse Electric & Manufacturing Company, East Pittsburgh, Pa., a corporation of Pennsylvania Application November 30, 1938, Serial No. 243,282

5 Claims. (Cl. 53—5)

My invention relates to a cooking appliance, more particularly to an appliance comprising a receptacle, such as an electric roaster body, a rack therein for supporting a shelf on which food is placed to be broiled, and a heating unit above the shelf.

An object of my invention is to provide an improved appliance of the character set forth.

Another object is to provide means for adjustably supporting the broiler shelf at various elevations on the rack and whereby the same may be inserted and removed through the open top of the roaster body or receptacle, and adjusted from one position to another, without removing the rack from the roaster body.

These and other objects are effected by my invention as will be apparent from the following description and claims taken in accordance with the accompanying drawings, forming a part of this application, in which:

Figure 1:
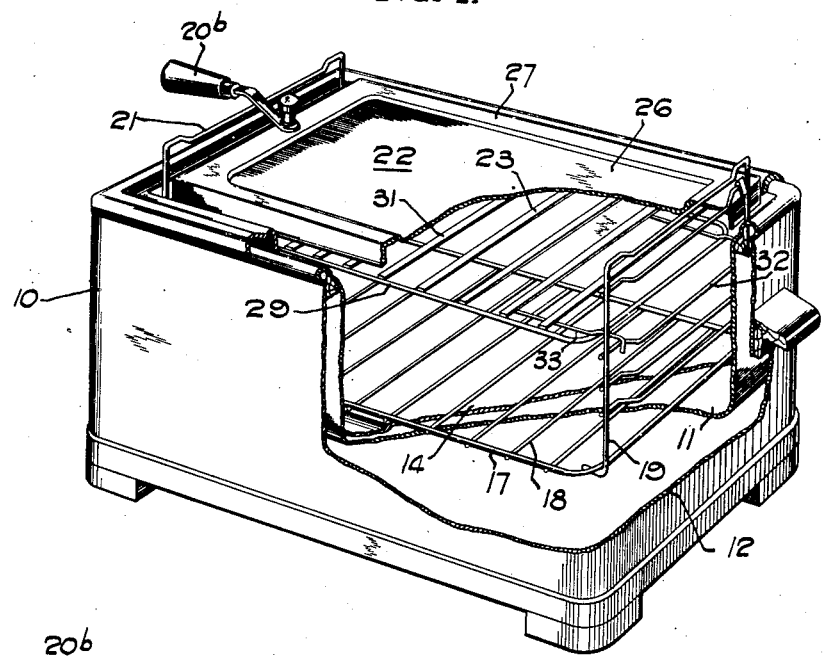
Fig. 1 is a perspective veiw, with parts broken away, of a cooking appliance constructed in accordance with my invention.

Referring to the drawings in detail, I show an electric roaster 10, comprising an inner casing 11 and an outer casing 12 arranged with their corresponding walls in spaced relation, a heating element 13 being provided on the inner casing as shown. A removable inset pan 14 may also be provided within the inner casing 11. As will be noted from the drawings, the roaster body includes bottom, side and end walls and is open at the top. A suitable cover (not shown) may be provided to constitute a closure for the open top.

A rack 16 is provided within the roaster body. It includes a rectangular frame member 17 and transverse bars 18 thereon forming a platform or grill for supporting articles of food or food containers to be heated by the electric heating element 13. The rack further comprises pieces of wire bent to inverted U-shape to provide vertical members 19 and cross bars 21 extending between the vertical members 19 at the ends of the roaster to provide handles or bails for lifting the rack 16 out of the roaster.

A heating unit 22 is mounted on the rack 16 adjacent the top of the roaster body, and a shelf 23 is mounted on the rack below the heating unit for holding articles of food to be broiled by radiant heat from the heating unit. The heating unit is provided at one end with hinge brackets 20 which are adapted to engage a cross bar 20ª secured to the vertical members 19. A handle 20ᵇ is attached to the heating unit at the opposite end and is adapted to rest on the adjacent cross bar 21. Accordingly, the heating unit may be swung upwardly about the cross bar 20ª to provide access to the shelf 23.

The heating unit 22 may be of any suitable construction, so far as the present invention is concerned, and in the illustrated embodiment it comprises an open radiant heating element 24 and a sheet metal heat reflector 25 above the heating element, the heating element and the sheet metal member being detachably connected. The sheet metal member is dished to provide a cooking surface 26, which is encompassed by a raised or rim portion 27 and which is thus adapted for frying. A removable heat reflector 28 may be provided below the heating element 24 to radiate heat upwardly to the sheet metal member 25 when the same is used for frying or other cooking on the member 25. For broiling, the reflector 28 is removed so that the lower surface of the sheet metal member 25 serves to reflect heat from the heating element downwardly, augmenting the heat radiated downwardly onto the articles of food on the shelf 23 to broil the same.

The shelf 23 is preferably in the form of a grid or grill comprising, in the illustrated embodiment, a rectangular frame 29 and transverse bars 31 soldered thereto. The shelf 23 may also be referred to as a broiling or baking rack, and the rack 16 may then be referred to as a lifting rack.

In accordance with the present invention, the shelf 23 is mounted on the rack 16 at any one of several different heights in a manner which enables the shelf to be inserted or removed through the open top of the roaster 10 without removing the rack 16 from the roaster. The rack 16 is provided, at each end, with three cross bars 32 extending between and soldered to the vertical members 19. In the illustrated embodiment, the shelf 23 is provided with wire elements 33, which extend therefrom at each end over the cross bar 32. At the outer ends, the wire elements 33 are bent downwardly to provide hooks or projections 34, which are adapted to engage the cross bars 32 to prevent the wire elements from sliding off the same.

The end portions of the cross bars 32 which are engaged by the wire elements 33 are spaced a suitable distance from the end wall of the inset pan, the distance being such that the shelf 23 may be moved horizontally toward said end wall until the opposite end of the shelf clears the cross bars 32, whereupon said opposite end of the shelf is free to swing upwardly or downwardly. The intermediate portions of the cross bars 32 are preferably offset toward the adjacent end wall to provide increased space for accommodating food containers when the same are used in connection with the heating element 13.

Figure 2:
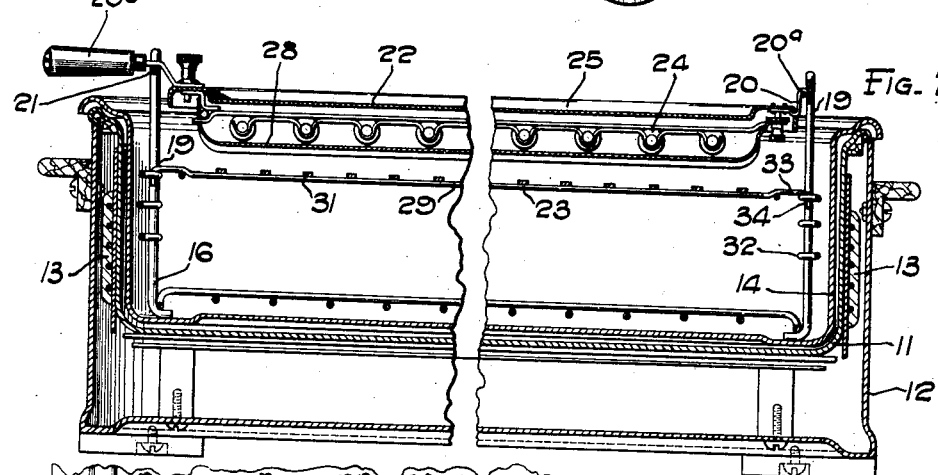
Fig. 2 is a longitudinal sectional view thereof.
Figure 3:
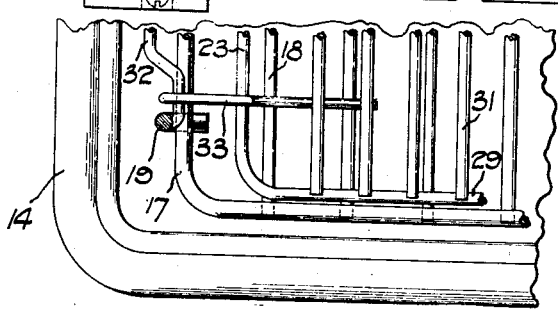
Fig. 3 is a fragmentary plan view of the rack structure.
Figure 4:
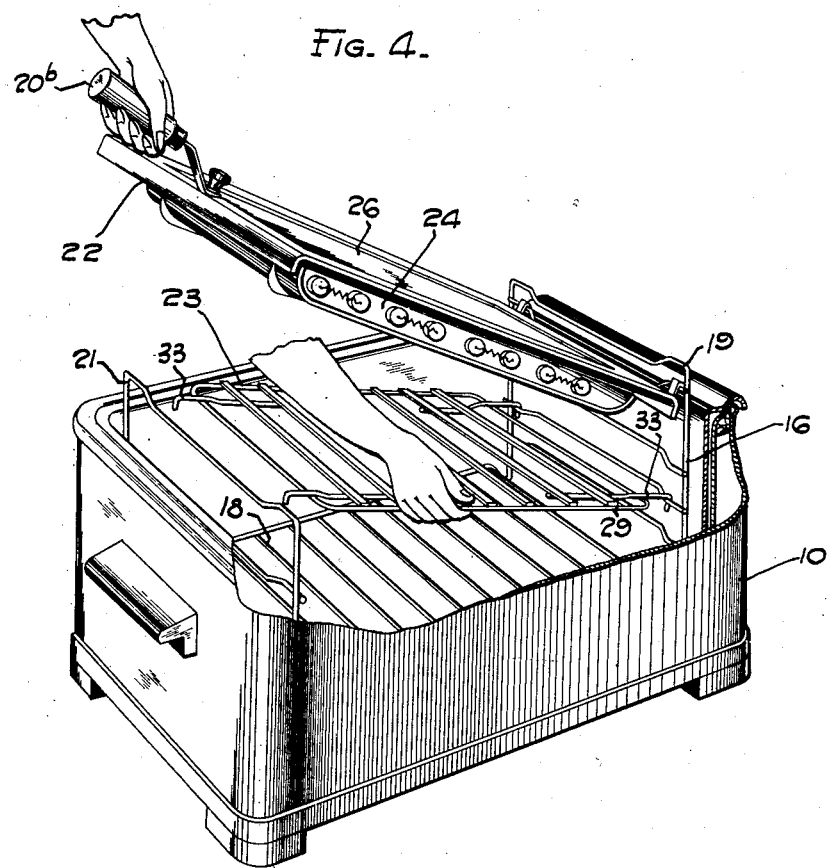
Fig. 4 is a perspective view showing how the heating unit may be swung upwardly and how the broiler shelf may be inserted from the top of the roaster; and, Fig. 5 is a longitudinal sectional view showing how the broiler shelf may be adjusted.
Figure 5:
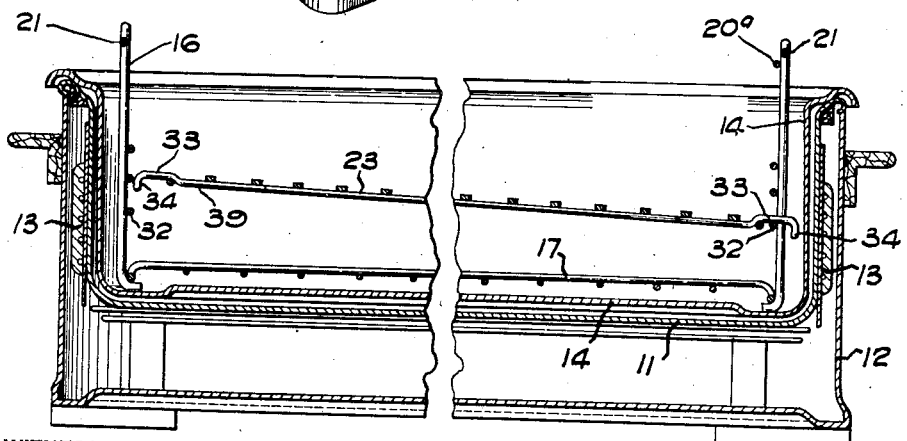

The shelf is manipulated into and out of position at any one of the three different heights, as follows: Assume, for example, that the shelf 23 is resting on the lowermost cross bar 32 at each end, and that it is desired to move the shelf to the uppermost cross bar at each end. One end of the shelf, for example, the left-hand end, is raised slightly to permit the hook portions or projections 34 to clear the lowermost cross bar 32. The shelf is then moved to the right until the ends of the wire elements 33 at the left-hand end clear the vertical row of cross bars 32. At the right-hand end, such movement is permitted by reason of the spacing of the end portions of the cross bars 32 from the end wall 14 as described above. The left-hand end of the shelf is swung upwardly a sufficient extent for the projections 34 to move over the uppermost cross bar 32. The right-hand end of the shelf is moved upwardly for the projections 34 to clear the lowermost cross bar 32 whereupon the shelf 23 is moved to the left a sufficient extent for the right-hand end of the shelf to clear the cross bars 32. The wire elements 33 at the left-hand end are brought to rest on the uppermost cross bar 32. The right-hand end of the shelf is then swung upwardly sufficiently for the projections 34 to clear the uppermost bar 32 at the right-hand end, whereupon the shelf 23 is moved to the right and the right-hand end brought to rest on the cross bar 32. The shelf 23 is now supported on the uppermost cross bars 32 at the opposite ends, as shown in Fig. 2, and it is retained from sliding off these cross bars by the projections 34.

To remove the shelf 23 from the roaster, one end thereof, for example, the left-hand end, is moved upwardly until the projections 34 clear the cross bar 32 on which the wire elements 33 have been resting. It is then moved to the right in the same manner as described above, until the ends of the wire elements clear the vertical row of cross bars 32. The left-hand end of the shelf is then swung upwardly until it clears the cross bar 21, whereupon the right-hand end is lifted sufficiently for the projections 34 to clear the cross bar on which the same had been resting. The shelf 23 is then moved upwardly and to the left, longitudinally of the shelf, out of the roaster.

To insert the shelf 23, it is moved diagonally, one end, for example, the right-hand end, being inserted immediately above the cross bar on which it is to rest. The left-hand end is then swung downwardly to a point which is above the cross bar on which it is to rest, the shelf is then moved to the left and the left-hand end is then moved down until it rests on the cross bar.

From the above description it will be seen that I have provided a structure whereby the shelf may be inserted and removed through the open top of the roaster, and may also be adjusted from one position to another, without removing the rack from the roaster.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. In a cooking appliance, the combination of a receptacle having an open top, a removable rack in said receptacle having four corner posts and horizontal bars extending between and attached to the adjacent corner posts at different heights on opposite sides of the rack, and a shelf having members extending horizontally over and resting on said bars for supporting the shelf thereon, the end portions of said members being bent downwardly to retain the shelf against horizontal movement, the projections on one side of the shelf being adapted to be moved toward the adjacent side of the receptacle a sufficient extent to permit the opposite side of the shelf to be swung upwardly clear of the horizontal bars on the opposite side of the shelf to permit removal of the shelf through the open top of the receptacle without removal of the rack.

2. In a cooking appliance, a rack adapted to be removably disposed in an open top receptacle and comprising four corner posts and horizontal bars extending between and attached to the adjacent corner posts on opposite sides of the rack, and a removable shelf adapted to rest on said bars on opposite sides of the rack, said shelf having downwardly-extending projections engaging with said bars to prevent horizontal movement of the shelf when it is positioned on said bars, said shelf being adapted to be moved horizontally toward one of said sides of the rack, when the projections restraining such movement are lifted to clear the associated bar, a sufficient extent for the shelf to clear the opposite side of the rack so that it may be swung upwardly for removal through the open top of the receptacle without removing the rack from the receptacle.

3. In a cooking appliance, the combination of a receptacle having an open top, a removable rack in said receptacle having four corner posts and horizontal bars extending between and attached to the corner posts on opposite sides of the rack at different heights, and a shelf having members extending horizontally over and resting on said bars for supporting the shelf thereon, said members having downwardly-extending projections at their ends adapted to engage said bars for retaining the shelf thereon against horizontal movement, the rack and the shelf being constructed and arranged so that, upon raising the projections on one side of the shelf to clear the adjacent bar, said shelf may be moved horizontally toward the opposite side of the shelf sufficiently for the projections on said one side to be swung upwardly clear of the bars on said one side to permit removal of the shelf through the open top of the receptacle without removing the rack from the receptacle.

4. In a cooking appliance, the combination of a receptacle having an open top, a removable shelf, a removable rack in said receptacle having shelf support portions disposed at different heights engaging cooperating portions of said shelf for supporting said shelf thereon, the cooperating portions of the shelf being adapted to slide horizontally on the shelf support portions, certain of the portions at each side of the rack having vertically extending projections adapted to engage the cooperating portions to limit the horizontal movement of the shelf, the cooperating portions at one side of the shelf permitting sufficient horizontal movement of the shelf so that, when the opposite side of the shelf is raised to clear the vertical projections, said opposite side of the shelf may be swung vertically clear of the adjacent shelf support portions.

5. In a cooking appliance or the like, the combination of a receptacle having upstanding walls encompassing the interior of the receptacle and having an open top, a removable shelf for use within said receptacle, and shelf support members disposed in said receptacle at different heights for supporting said shelf thereon at different heights, said shelf and said shelf support members being formed, at one side of said receptacle, with interlocking portions, including vertically extending portions, constructed and arranged to interlock and restrain horizontal movement of the shelf when it is in normal position resting on said shelf support members and adapted to disengage and permit horizontal movement of the shelf upon raising the shelf from said normal position at said one side; said shelf, said shelf support members and said receptacle being formed so that, when said shelf is so raised at said one side and said shelf support members remain stationary, said shelf may be moved horizontally a sufficient distance tt permit one side of the shelf to be swung vertically clear of the adjacent shelf support members, whereby the shelf may be adjusted from one height to another and inserted in and removed from the receptacle through the open top without removing the shelf support members from said receptacle.

JOSEPH R. HEILMAN.